(12) United States Patent
Kamath et al.

(10) Patent No.: US 11,747,581 B2
(45) Date of Patent: *Sep. 5, 2023

(54) REDUCED DIAMETER RUGGEDIZED FIBER OPTIC DISTRIBUTION CABLES

(71) Applicant: AFL Telecommunications LLC, Duncan, SC (US)

(72) Inventors: Rajesh Kamath, Greenville, SC (US); Michael Houck, Greenville, SC (US); Brett Villiger, Simpsonville, SC (US); Justin Quinn, Boiling Springs, SC (US); Joseph Cignarale, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,698

(22) Filed: Sep. 20, 2021

(65) Prior Publication Data

US 2022/0003953 A1 Jan. 6, 2022

Related U.S. Application Data

(63) Continuation of application No. 16/908,121, filed on Jun. 22, 2020, now Pat. No. 11,150,426, which is a
(Continued)

(51) Int. Cl.
*G02B 6/44* (2006.01)

(52) U.S. Cl.
CPC ......... *G02B 6/4432* (2013.01); *G02B 6/4403* (2013.01); *G02B 6/4433* (2013.01); *G02B 6/4436* (2013.01)

(58) Field of Classification Search
None
See application file for complete search history.

(56) References Cited

U.S. PATENT DOCUMENTS 5,074,640 A 12/1991 Hardin
5,627,932 A 5/1997 Kiel
(Continued)

FOREIGN PATENT DOCUMENTS

CN 1407361 A 4/2003
CN 1409146 A 4/2003
(Continued)

OTHER PUBLICATIONS

"Premise & Fiber Optic Cable Catalog", Hitachi Cable America Inc., pp. 66-67, Rev Jul. 2014. Retrieved from https://www.teledynamics.com/tdresources/8c8a005e-efc7-4faf-a1af-2723d07edf76.pdf . (Year: 2014).*
(Continued)

*Primary Examiner* — Michael Stahl
(74) *Attorney, Agent, or Firm* — Dority & Manning, P.A.

(57) ABSTRACT

A fiber optic distribution cable includes a central inner jacket formed from one of a polyvinyl chloride or a low smoke zero halogen material, a plurality of optical fibers disposed within the inner jacket, and a plurality of first strength members disposed within the inner jacket. The fiber optic distribution cable further includes an outer jacket surrounding the central inner jacket, the outer jacket formed from the one of the polyvinyl chloride or the low smoke zero halogen material, and a plurality of second strength members disposed between the outer jacket and the central inner jacket. A fiber density of the cable is greater than 0.65 fibers per square millimeter.

17 Claims, 2 Drawing Sheets

Related U.S. Application Data continuation of application No. 16/478,064, filed as application No. PCT/US2017/014858 on Jan. 25, 2017, now Pat. No. 10,754,114.

(56) References Cited

U.S. PATENT DOCUMENTS

| | | | |
|---|---|---|---|
| 6,453,097 | B1 | 9/2002 | Newton |
| 8,655,127 | B2 | 2/2014 | Leonard |
| 10,754,114 | B2 | 8/2020 | Kamath |
| 11,150,426 | B2 * | 10/2021 | Kamath ............... G02B 6/4433 |
| 2004/0050579 | A1 | 3/2004 | Hager |
| 2006/0280413 | A1 | 12/2006 | Paschal |
| 2008/0285924 | A1 | 11/2008 | Graveston |
| 2011/0091171 | A1 | 4/2011 | Tatat |
| 2011/0200291 | A1 | 8/2011 | Logan |
| 2015/0016790 | A1 | 1/2015 | Hudson |
| 2015/0234139 | A1 | 8/2015 | Cignarale |
| 2016/0161692 | A1 | 6/2016 | Namazue |
| 2017/0023754 | A1 | 1/2017 | Debban |
| 2017/0192189 | A1 | 7/2017 | Gonzalez |

FOREIGN PATENT DOCUMENTS

| | | |
|---|---|---|
| CN | 2619272 Y | 6/2004 |
| CN | 1894613 A | 1/2007 |
| CN | 101515052 A | 8/2009 |
| CN | 101546019 A | 9/2009 |
| CN | 102662220 A | 9/2012 |
| CN | 104808303 A | 7/2015 |
| CN | 205121031 U | 3/2016 |
| WO | WO2013/043966 A1 | 3/2013 |

OTHER PUBLICATIONS

R. L. Graham et al. Dense packings of congruent circles in a circle. Discrete Mathematics, vol. 181, issues 1-3, pp. 139-154, Feb. 15, 1998. (https://doi.org/10.1016/S0012-365X(97)00050-2) (Year: 1998).*

AFL Telecommunications LLC; International Patent Application No PCT/US2017/014858; International Search Report; dated Sep. 29, 2017; (3 pages).

Fibrefab: "Conncectivity Cable Brochure", Jan. 1, 2011 (Jan. 1, 2011), XP055407203, URL: https://www.anixter.com/content/dam/Suppliers/FibreFab/Literature/Fibrefab-Connectivity-Cable-Catalogue-ver3.1.pdf, p. 21.

Hitachi: "Premise & Fiber Optic Cable Catalog", Jul. 1, 2014 (Jul. 1, 2014), XP055407208, URL: http://www.datcominc.com/edit/files/catalogues/HitachiPremiseFiberOpticCatalogue.pdf , p. 35-36.

AFL: "Specialty Fiber Optic Cable Fiber Optic Component for Umbilical Cable", Dec. 3, 2015 (Dec. 3, 2015), XP055407213, URL: http://www.betame.eu/images/files/Fiber-Optic-Component-for-Umbilical_-Cable.pdf.

Gaillard et al.; "Optimization of Loose Tube Cable Designs: The Next Step"; International Wire & Cable Symposium Proceedings, pp. 913-920.

FibreFab, "Fibrefab: "Conncectivity Cable Brochure"", https://www.anixter.com/content/dam/Suppliers/FibreFab/Literature/Fibrefab-Connectivity-Cable-Catalogue-ver3.1.pdf, Jan. 1, 2011 (Jan. 1, 2011).

* cited by examiner

REDUCED DIAMETER RUGGEDIZED FIBER OPTIC DISTRIBUTION CABLES

This application is a continuation of U.S. patent application Ser. No. 16/908,121, filed on Jun. 22, 2020, which is a continuation of U.S. patent application Ser. No. 16/478,064, filed on Jul. 15, 2019, which is a National Stage Patent Application of PCT/US2017/014858, filed on Jan. 25, 2017, the disclosures of which are incorporated by reference herein in their entireties.

FIELD OF THE INVENTION

The present disclosure relates generally to fiber optic distribution cables, and more particularly to fiber optic distribution cables having increased fiber densities and reduced associated diameters.

BACKGROUND OF THE INVENTION

Optical fiber distribution cables are utilized in building/campus local area networks, central offices, data centers and other premises where high bandwidth data transfer is required. These cables can be deployed in both overhead and raised floor cable pathways, along with terminations into data cabinets. As data transfer requirements have increased, the number of fibers to support these demands has driven the development of high fiber density products. High density micro-cabling along with multi-fiber connectivity have been instrumental in supporting the increasing demands for high bandwidth data transfer.

Known distribution cables are typically sub-unitized and include a central strength member. However, while many such distribution cables are useful and provide the desired performance characteristics, improvements in distribution cable design are desired. For example, increased flexibility and fiber density are desired to provide improved installation and optical transmission capabilities. However, the ruggedness and relatively small overall size of the cables must desirable be maintained.

Accordingly, improved fiber optic distribution cables are desired in the art.

BRIEF DESCRIPTION OF THE INVENTION

Aspects and advantages of the invention will be set forth in part in the following description, or may be obvious from the description, or may be learned through practice of the invention.

In accordance with one embodiment, a fiber optic distribution cable is provided. The fiber optic distribution cable includes a central inner jacket formed from one of a polyvinyl chloride or a low smoke zero halogen material, a plurality of optical fibers disposed within the inner jacket, and a plurality of first strength members disposed within the inner jacket. The fiber optic distribution cable further includes an outer jacket surrounding the central inner jacket, the outer jacket formed from the one of the polyvinyl chloride or the low smoke zero halogen material, and a plurality of second strength members disposed between the outer jacket and the central inner jacket. A fiber density of the cable is greater than 0.65 fibers per square millimeter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
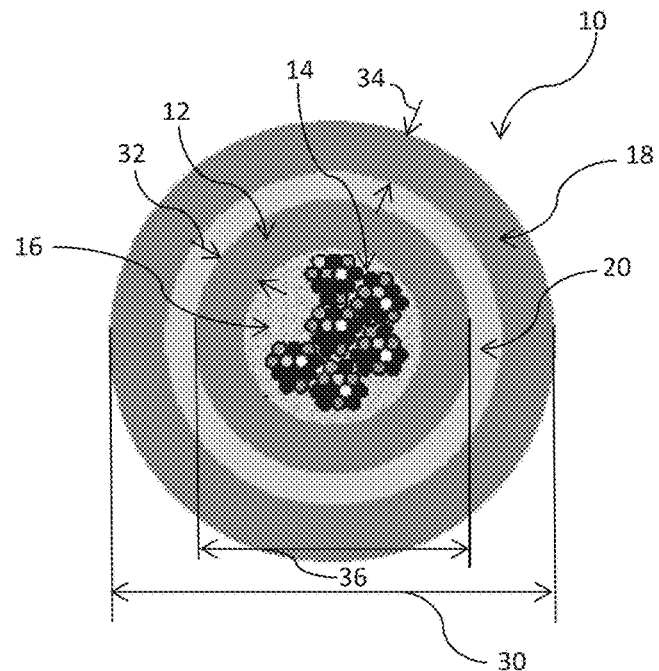
FIG. 1 is a cross-sectional view of a fiber optic distribution cable in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a fiber optic distribution cable 10 in accordance with embodiments of the present disclosure is provided. Cable 10 includes an inner jacket 12, and a plurality of optical fibers 14 disposed within the inner jacket 12. Additionally, a plurality of first strength members 16 may be disposed within the inner jacket 12. An outer jacket 18 may surround the inner jacket 12, and a plurality of second strength members 20 may be disposed between the outer jacket 18 and the inner jacket 12.

The inner jacket 12 is, as shown, a central inner jacket 12 which thus generally encompasses a center point of the cable 10 in a cross-sectional view. Further, as shown, only a single inner jacket 12 is utilized. In other words, only a single sub-unit, rather than multiple sub-units, is utilized in cable 10. All optical fibers 14 utilized in cable 10 are thus disposed within inner jacket 12. The inner jacket 12 has a generally continuous tubular cross-sectional shape, as shown.

The inner jacket 12 may be formed from one of a polyvinyl chloride or a low smoke zero halogen material. In some embodiments, for example, the inner jacket 12 may be formed from a polyvinyl chloride. In exemplary embodiments, the inner jacket 12, and thus the material utilized to form the inner jacket 12, may be riser-rated or plenum-rated. For example, the inner jacket 12 and material thereof may have a flame rating of OFNR-LS/FT4 (riser-rated) (with, for example, a flame propagation characteristic of less than 12 feet) or OFNP/FT6 (plenum-rated) (with, for example, a flame propagation characteristic of less than 5 feet). In alternative embodiments, the inner jacket 12 may be formed from a low smoke zero halogen material, which may for example, include a polyolefin such as polyethylene. In exemplary embodiments, the inner jacket 12 and material thereof may have a flame rating of OFNR-LS/FT4 (with, for example, a flame propagation characteristic of less than 12 feet).

The outer jacket 18 also has a generally continuous tubular cross-sectional shape, as shown. The outer jacket 18, which may be the outermost exterior layer of the cable 10, may be formed from the same material as the inner jacket 12. Accordingly, the outer jacket 18 may be formed from one of a polyvinyl chloride or a low smoke zero halogen material. In some embodiments, for example, the outer jacket 18 may be formed from a polyvinyl chloride. In exemplary embodiments, the outer jacket 18, and thus the material utilized to form the outer jacket 18, may be riser-rated or plenum-rated. For example, the outer jacket 18 and material thereof may have a flame rating of OFNR-LS/FT4 (riser-rated) (with, for example, a flame propagation characteristic of less than 12 feet) or OFNP/FT6 (plenum-rated) (with, for example, a flame propagation characteristic of less than 5 feet). In alternative embodiments, the outer jacket 18 may be formed from a low smoke zero halogen material, which may for example, include a polyolefin such as polyethylene. In exemplary embodiments, the outer jacket 18 and material thereof may have a flame rating of OFNR-LS/FT4 (with, for example, a flame propagation characteristic of less than 12 feet).

As discussed, first strength members 16 may be disposed within the inner jacket 12, and second strength members 20 may be disposed between the outer jacket 18 and inner jacket 12. In exemplary embodiments, the first strength members 16 and second strength members 20 may be fibers, such as aramid fibers or other suitable fibers utilized for strength purposes. It should be noted that, in exemplary embodiments as shown, no additional components or materials, aside from second strength members 20 and optional binders or ripcords, may be provided in the space between the outer jacket 18 and inner jacket 12. Such space may thus, for example, be free from gels, additional intervening jackets or other tubes, etc. Similarly, in exemplary embodiments as shown, no additional components or materials, aside from first strength members 16 and optical fibers 14 as discussed herein, may be provided within inner jacket 12.

Figure 2:
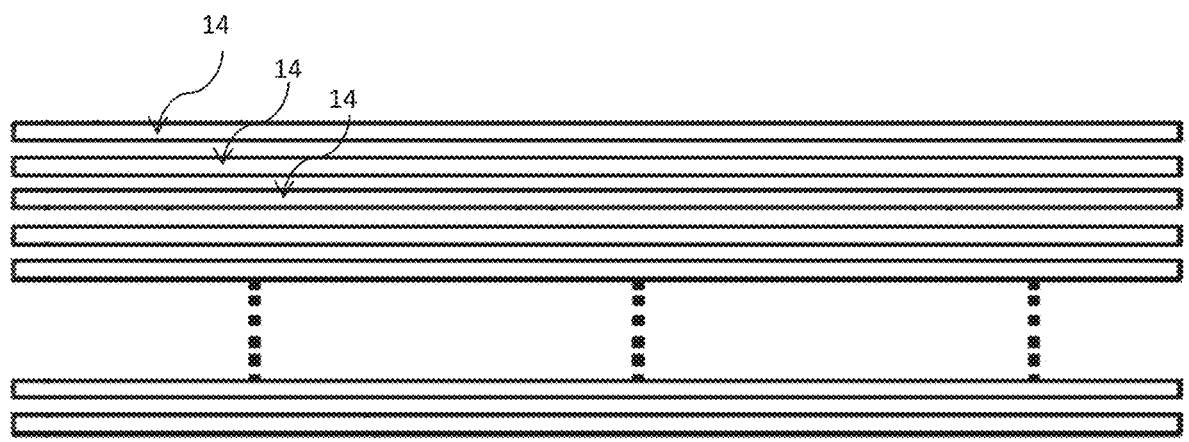
FIG. 2 is a top view of a plurality of optical fibers utilized in a fiber optic distribution cable in accordance with some embodiments of the present disclosure.
Figure 3:
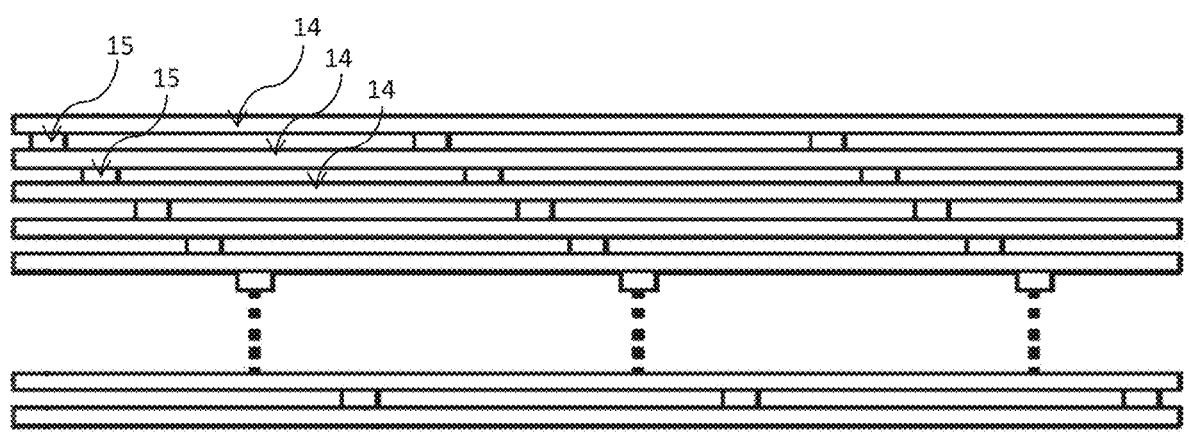
FIG. 3 is a top view of a plurality of optical fibers utilized in a fiber optic distribution cable in accordance with other embodiments of the present disclosure.

Any suitable optical fibers 14 may be utilized in cable 10. For example, the optical fibers 16 may be single mode optical fibers or multi-mode optical fibers. Further, in some embodiments, the optical fibers 14 may have nominal (plus or minus 3 microns) outer diameters of 250 microns. In alternative embodiments, the optical fibers 14 may have nominal outer diameters of 200 microns. In some embodiments, as illustrated in FIG. 2, the optical fibers 14 may be loose optical fibers which are not ribbonized or otherwise bonded to each other. In alternative embodiments, the optical fibers 14 may be ribbonized to form one or more ribbons. For example, in some embodiments as illustrated in FIG. 3, the optical fibers 14 may be intermittently bonded to each other (via, for example, portions of the outermost jacket or layer of the optical fibers 14), thus forming one or more ribbons. Such intermittent bonding may occur along the lengths of the optical fibers 14, thus leaving non-bonded gaps between neighboring optical fibers 14 as shown. Further, the bonded portions 15 of neighboring optical fibers 14 may be staggered along the lengths of the optical fibers 14 such that neighboring optical fibers 14 in a ribbon are bonded to each other at different locations along their lengths and the length of the ribbon.

Referring again to FIG. 1, cables 10 in accordance with the present disclosure may advantageously have relatively high fiber densities. As utilized herein, fiber density is the total number of optical fibers in a cable 10 divided by the cross-sectional area of the cable 10. The cross-sectional area may be calculated as pi times the square of the maximum radius of the cable 10, and the maximum radius may be half of the maximum outer diameter 30 of the outer jacket 18. Further, cables 10 in accordance with the present disclosure may have such relatively high fiber densities while advantageously meeting the OFNR-LS/FT4, OFNP/FT6, and/or OFNR-LS/FT4 requirements. Meeting such requirements may require that wall thicknesses 32, 34 of the inner jacket 12 and outer jacket 18, respectively, may be relatively high for relatively low maximum outer diameters 30 and maximum outer diameters 36 of the inner jacket 12, thus further illustrating the advantageously high fiber densities achieved in accordance with the present disclosure. For example, as discussed herein and depending on the outer diameter 30, the inner jacket 12 may have a wall thickness 32 of between 0.35 and 1.1 millimeters, and the outer jacket 18 may have a wall thickness 34 of between 0.5 and 1.4 millimeters.

In some embodiments, the maximum outer diameter 30 may be less than or equal to 5 millimeters, such as less than or equal to 4.9 millimeters, such as between 4.9 millimeters and 4.7 millimeters, such as 4.8 millimeters. In these embodiments and when 250 nominal diameter micron optical fibers 14 are utilized, the fiber density may be between 0.65 and 1.35 fibers per square millimeter, such as between 0.66 and 1.33 fibers per square millimeter. Such embodiments may, for example, utilize between 10 and 25 optical fibers 14, such as in some embodiments 12, 16, or 24 optical fibers 14. For example, in embodiments wherein 12 optical fibers 14 are utilized, the fiber density may be between 0.65 and 0.67 fibers per square millimeter, such as between 0.66 and 0.665 fibers per square millimeter. In embodiments wherein 16 optical fibers 14 are utilized, the fiber density may be between 0.87 and 0.89 fibers per square millimeter, such as between 0.88 and 0.885 fibers per square millimeter. In embodiments wherein 24 optical fibers 14 are utilized, the fiber density may be between 1.31 and 1.34 fibers per square millimeter, such as between 1.32 and 1.33 fibers per square millimeter.

Further, in these embodiments, the inner jacket 12 may have a wall thickness 32 of between 0.35 and 0.45 millimeters, such as 0.4 millimeters. The outer jacket 18 may have a wall thickness 34 of between 0.5 and 0.6 millimeters, such as 0.55 millimeters. The maximum outer diameter 36 of the inner jacket 12 may be between 2.8 and 3.2 millimeters, such as between 2.9 and 3.1 millimeters, such as 3 millimeters.

In other embodiments, the maximum outer diameter 30 may be less than or equal to 5.8 millimeters, such as less than or equal to 5.7 millimeters, such as between 5.7 millimeters and 5.5 millimeters, such as 5.6 millimeters. In these embodiments and when 250 nominal diameter micron optical fibers 14 are utilized, the fiber density may be between 1.45 and 1.95 fibers per square millimeter. Such embodiments may, for example, utilize between 30 and 50 optical fibers 14, such as in some embodiments 36 or 48 optical fibers 14. For example, in embodiments wherein 36 optical fibers 14 are utilized, the fiber density may be between 1.45 and 1.48 fibers per square millimeter, such as between 1.46 and 1.47 fibers per square millimeter. In embodiments wherein 48 optical fibers 14 are utilized, the fiber density may be between 1.93 and 1.95 fibers per square millimeter, such as between 1.94 and 1.95 fibers per square millimeter.

Further, in these embodiments, the inner jacket 12 may have a wall thickness 32 of between 0.5 and 0.6 millimeters, such as 0.55 millimeters. The outer jacket 18 may have a wall thickness 34 of between 0.55 and 0.65 millimeters, such as 0.6 millimeters. The maximum outer diameter 36 of the inner jacket 12 may be between 3.6 and 4.2 millimeters, such as between 3.7 and 4.1 millimeters, such as 3.8 millimeters or 4 millimeters.

In other embodiments, the maximum outer diameter 30 may be less than or equal to 6.5 millimeters, such as less than or equal to 6.4 millimeters, such as between 6.1 millimeters and 6.5 millimeters, such as 6.2 millimeters or 6.4 millimeters. In these embodiments and when 250 nominal diameter micron optical fibers 14 are utilized, the fiber density may be between 2.1 and 2.25 fibers per square millimeter. Such embodiments may, for example, utilize between 60 and 80 optical fibers 14, such as in some embodiments 64 or 72 optical fibers 14. For example, in embodiments wherein 64 optical fibers 14 are utilized, the fiber density may be between 2.0 and 2.2 fibers per square millimeter, such as between 2.1 and 2.15 fibers per square millimeter. In embodiments wherein 72 optical fibers 14 are utilized, the fiber density may be between 2.1 and 2.3 fibers per square millimeter, such as between 2.2 and 2.25 fibers per square millimeter.

Further, in these embodiments, the inner jacket 12 may have a wall thickness 32 of between 0.65 and 0.85 millimeters, such as 0.7 millimeters or 0.8 millimeters. The outer jacket 18 may have a wall thickness 34 of between 0.65 and 0.75 millimeters, such as 0.7 millimeters. The maximum outer diameter 36 of the inner jacket 12 may be between 4.3 and 5 millimeters, such as between 4.4 and 4.9 millimeters, such as 4.5 millimeters or 4.8 millimeters.

In other embodiments, the maximum outer diameter 30 may be less than or equal to 10.2 millimeters, such as less than or equal to 10.1 millimeters, such as between 7.5 millimeters and 10.1 millimeters, such as 7.8 millimeters or 9 millimeters or 10 millimeters. In these embodiments and when 250 nominal diameter micron optical fibers 14 are utilized, the fiber density may be between 1.65 and 2.05 fibers per square millimeter. Such embodiments may, for example, utilize between 90 and 150 optical fibers 14, such as in some embodiments 96, 108, or 144 optical fibers 14. For example, in embodiments wherein 96 optical fibers 14 are utilized, the fiber density may be between 1.9 and 2.1 fibers per square millimeter, such as between 2 and 2.02 fibers per square millimeter. In embodiments wherein 108 optical fibers 14 are utilized, the fiber density may be between 1.66 and 1.74 fibers per square millimeter, such as between 1.68 and 1.7 fibers per square millimeter. In embodiments wherein 144 optical fibers 14 are utilized, the fiber density may be between 1.8 and 1.85 fibers per square millimeter, such as between 1.82 and 1.84 fibers per square millimeter.

Further, in these embodiments, the inner jacket 12 may have a wall thickness 32 of between 0.75 and 1.1 millimeters, such as 0.8 millimeters or 0.9 millimeters or 1 millimeter. The outer jacket 18 may have a wall thickness 34 of between 0.85 and 1.35 millimeters, such as 0.9 millimeters, 1.2 millimeters, or 1.3 millimeters. The maximum outer diameter 36 of the inner jacket 12 may be between 5.6 and 7.4 millimeters, such as between 5.7 and 7.3 millimeters, such as 5.8 millimeters, 6.2 millimeters, or 7.2 millimeters.

Table 1 below provides various dimensions for cables 10 in accordance with exemplary embodiments of the present disclosure:

TABLE 1

| Cable Dimensions (250 micron optical fiber nominal diameter) | | | | | |
|---|---|---|---|---|---|
| # of Optical Fibers (250 micron) | Inner Jacket OD | Inner Jacket Wall Thickness | Outer jacket OD | Outer Jacket Wall Thickness | Fiber density |
| 12 | 3.0 | 0.40 | 4.80 | 0.55 | 0.663 |
| 16 | 3.0 | 0.40 | 4.80 | 0.55 | 0.884 |
| 24 | 3.0 | 0.40 | 4.80 | 0.55 | 1.326 |
| 36 | 3.8 | 0.55 | 5.60 | 0.60 | 1.462 |
| 48 | 4.0 | 0.55 | 5.60 | 0.60 | 1.949 |
| 64 | 4.5 | 0.70 | 6.20 | 0.70 | 2.120 |
| 72 | 4.8 | 0.80 | 6.40 | 0.70 | 2.238 |
| 96 | 5.8 | 0.80 | 7.80 | 0.90 | 2.009 |
| 108 | 6.2 | 0.90 | 9.00 | 1.20 | 1.698 |
| 144 | 7.2 | 1.00 | 10.00 | 1.30 | 1.833 |

In some embodiments, the maximum outer diameter 30 may be less than or equal to 5 millimeters, such as less than or equal to 4.8 millimeters, such as less than or equal to 4.6 millimeters, such as between 4.8 millimeters and 4.3 millimeters, such as between 4.6 millimeters and 4.4 millimeters, such as 4.5 millimeters. In these embodiments and when 200 nominal diameter micron optical fibers 14 are utilized, the fiber density may be between 0.75 and 2.27 fibers per square millimeter, such as between 0.753 and 2.267 fibers per square millimeter. Such embodiments may, for example, utilize between 10 and 40 optical fibers 14, such as in some embodiments 12, 16, 24, or 36 optical fibers 14. For example, in embodiments wherein 12 optical fibers 14 are utilized, the fiber density may be between 0.75 and 0.76 fibers per square millimeter, such as between 0.753 and 0.757 fibers per square millimeter. In embodiments wherein 16 optical fibers 14 are utilized, the fiber density may be between 1 and 1.05 fibers per square millimeter, such as between 1.002 and 1.01 fibers per square millimeter. In embodiments wherein 24 optical fibers 14 are utilized, the fiber density may be between 1.5 and 1.52 fibers per square millimeter, such as between 1.505 and 1.51 fibers per square millimeter. In embodiments wherein 36 optical fibers 14 are utilized, the fiber density may be between 2.26 and 2.27 fibers per square millimeter, such as between 1.505 and 1.51 fibers per square millimeter.

Further, in these embodiments, the inner jacket 12 may have a wall thickness 32 of between 0.35 and 0.6 millimeters, such as 0.4 millimeters or 0.55 millimeters. The outer jacket 18 may have a wall thickness 34 of between 0.5 and 0.6 millimeters, such as 0.55 millimeters. The maximum outer diameter 36 of the inner jacket 12 may be between 2.8 and 3.2 millimeters, such as between 2.9 and 3.1 millimeters, such as 3 millimeters.

In some embodiments, the maximum outer diameter 30 may be less than or equal to 5.8 millimeters, such as less than or equal to 5.7 millimeters, such as between 5.8 millimeters and 5.4 millimeters, such as between 5.7 millimeters and 5.5 millimeters, such as 5.6 millimeters. In these embodiments and when 200 nominal diameter micron optical fibers 14 are utilized, the fiber density may be between 1.94 and 2.95 fibers per square millimeter, such as between 1.945 and 2.93 fibers per square millimeter. Such embodiments may, for example, utilize between 30 and 80 optical fibers 14, such as in some embodiments 48, 64, or 72 optical fibers 14. For example, in embodiments wherein 48 optical fibers 14 are utilized, the fiber density may be between 1.94 and 1.96 fibers per square millimeter, such as between 1.945 and 1.95 fibers per square millimeter. In embodiments wherein 64 optical fibers 14 are utilized, the fiber density may be between 2.58 and 2.61 fibers per square millimeter, such as between 2.59 and 2.6 fibers per square millimeter. In embodiments wherein 72 optical fibers 14 are utilized, the fiber density may be between 2.85 and 2.95 fibers per square millimeter, such as between 2.9 and 2.93 fibers per square millimeter.

Further, in these embodiments, the inner jacket 12 may have a wall thickness 32 of between 0.5 and 0.6 millimeters, such as 0.55 millimeters. The outer jacket 18 may have a wall thickness 34 of between 0.65 and 0.75 millimeters, such as 0.7 millimeters. The maximum outer diameter 36 of the inner jacket 12 may be between 3.6 and 4 millimeters, such as between 3.7 and 3.9 millimeters, such as 3.8 millimeters.

In some embodiments, the maximum outer diameter 30 may be less than or equal to 7.6 millimeters, such as less than or equal to 7.5 millimeters, such as between 7.6 millimeters and 6 millimeters, such as between 7.55 millimeters and 6.1 millimeters, such as 6.2 millimeters, 6.4 millimeters, or 7.5 millimeters. In these embodiments and when 200 nominal diameter micron optical fibers 14 are utilized, the fiber density may be between 3.16 and 3.36 fibers per square millimeter, such as between 3.17 and 3.359 fibers per square millimeter. Such embodiments may, for example, utilize between 90 and 150 optical fibers 14, such as in some embodiments 96, 108, or 144 optical fibers 14. For example, in embodiments wherein 96 optical fibers 14 are utilized, the fiber density may be between 3.16 and 3.2 fibers per square millimeter, such as between 3.17 and 3.19 fibers per square millimeter. In embodiments wherein 108 optical fibers 14 are utilized, the fiber density may be between 3.35 and 3.36 fibers per square millimeter, such as between 3.354 and 3.359 fibers per square millimeter. In embodiments wherein 144 optical fibers 14 are utilized, the fiber density may be between 3.25 and 3.27 fibers per square millimeter, such as between 3.255 and 3.26 fibers per square millimeter.

Further, in these embodiments, the inner jacket 12 may have a wall thickness 32 of between 0.65 and 0.85 millimeters, such as 0.7 millimeters or 0.8 millimeters. The outer jacket 18 may have a wall thickness 34 of between 0.65 and 0.95 millimeters, such as 0.7 millimeters or 0.9 millimeters. The maximum outer diameter 36 of the inner jacket 12 may be between 4.3 and 5.6 millimeters, such as between 4.4 and 5.5 millimeters, such as 4.5 millimeters, 4.8 millimeters, or 5.4 millimeters.

Table 2 below provides various dimensions for cables 10 in accordance with exemplary embodiments of the present disclosure:

TABLE 2

Cable Dimensions (200 micron optical fiber nominal diameter)

| # of Optical Fibers (200 micron) | Inner Jacket OD | Inner Jacket Wall Thickness | Outer jacket OD | Outer Jacket Wall Thickness | Fiber density |
|---|---|---|---|---|---|
| 12 | 3.0 | 0.55 | 4.50 | 0.55 | 0.755 |
| 16 | 3.0 | 0.40 | 4.50 | 0.55 | 1.006 |
| 24 | 3.0 | 0.40 | 4.50 | 0.55 | 1.509 |
| 36 | 3.0 | 0.40 | 4.50 | 0.55 | 2.264 |
| 48 | 3.8 | 0.55 | 5.60 | 0.70 | 1.949 |
| 64 | 3.8 | 0.55 | 5.60 | 0.70 | 2.598 |
| 72 | 3.8 | 0.55 | 5.60 | 0.70 | 2.923 |
| 96 | 4.5 | 0.70 | 6.20 | 0.70 | 3.180 |
| 108 | 4.8 | 0.80 | 6.40 | 0.70 | 3.357 |
| 144 | 5.4 | 0.80 | 7.50 | 0.90 | 3.259 |

Cables 10 in accordance with the present disclosure may further advantageously meet various Telecordia GR-409 Core Horizontal Backbone standard (GR-409 Issue 2, November 2008) requirements. In particular, such cables 10 may meet the GR-409 requirements for outer jacket shrinkage, compressive strength, tensile strength, temperature cycling, low-high temperature bend, impact resistance, cable twist, and/or cyclic flexing. For example, in some embodiments, a cable 10 in accordance with the present disclosure may have a tensile strength of up to or at least 150 pounds. In some embodiments, a cable 10 in accordance with the present disclosure may exhibit an attenuation change of less than or equal to 0.03 dB, such as 0.02 dB when subjected to 4 bends around a 7 inch diameter mandrel and with a 12.5 kg weight suspended at the end of the 4 wraps at −10, 0, 60, or 70° C. In some embodiments, a cable 10 in accordance with the present disclosure may exhibit an attenuation change of less than or equal to 0.003 dB, such as 0.002 dB, when subjected to 25 cycles in a 180 degree arc (90 degrees clockwise and 90 degrees counterclockwise) with a 4 kg load attached to the end. In some embodiments, a cable 10 in accordance with the present disclosure may exhibit an attenuation change of less than or equal to 0.006 dB, such as 0.005 dB, when subjected to a minimum of 10 cycles of being twisted 180 degrees clockwise and counter-clockwise. In some embodiments, a cable 10 in accordance with the present disclosure may exhibit an attenuation change of less than or equal to 0.17 dB, such as less than or equal to 0.16 dB, when subjected to a compressive load of at least 100 N/cm over a period of 10 minutes, with the load applied at an increase of 3 to 20 mm per minute. In some embodiments, a cable 10 in accordance with the present disclosure may exhibit an attenuation change of less than or equal to 0.003 dB, such as less than or equal to 0.002 dB, when subjected to 2 impacts at 3 locations (which are 150 mm apart) of a drop force of 2.94 Nm from a height of 150 mm. In some embodiments, a cable 10 in accordance with the present disclosure may exhibit an attenuation change of less than or equal to 0.5 dB, such as less than or equal to 0.3 dB (single mode fiber) or less than or equal to 0.4 dB (multi-mode fiber) when subjected to extreme temperatures over 120 hours ranging from −20° C. to 70° C. (for plenum-rated cables) or −40° C. to 70° C. (for LSZH cables), including a rate of change of temperature of 40 degrees per hour and multiple exposure cycles at the extreme temperatures for 24 continuous hours within the 120 hours.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic distribution cable, comprising:
a central inner jacket;
a plurality of optical fibers disposed within the inner jacket, wherein at least some of the plurality of optical fibers are intermittently bonded into one or more ribbons;
a plurality of first strength members disposed within the inner jacket;
an outer jacket surrounding the central inner jacket; and
a plurality of second strength members disposed between the outer jacket and the central inner jacket, wherein the inner jacket and the outer jacket are formed from a polyolefin.

2. The fiber optic distribution cable of claim 1, wherein optical fibers of each of the one or more ribbons are intermittently bonded together by bonded portions, and wherein the bonded portions are spaced apart from one another along the lengths of the optical fibers.

3. The fiber optic distribution cable of claim 2, wherein the bonded portions of neighboring optical fibers are staggered along the lengths of the optical fibers.

4. The fiber optic distribution cable of claim 1, wherein others of the plurality of optical fibers are loose optical fibers.

5. A fiber optic distribution cable, comprising:
a central inner jacket formed from one of a polyvinyl chloride or a low smoke zero halogen material;
a plurality of optical fibers disposed within the inner jacket, wherein at least some of the plurality of optical fibers are intermittently bonded into one or more ribbons;
a plurality of first strength members disposed within the inner jacket;
an outer jacket surrounding the central inner jacket, the outer jacket formed from the one of the polyvinyl chloride or the low smoke zero halogen material; and
a plurality of second strength members disposed between the outer jacket and the central inner jacket,
wherein the fiber density is between 1.45 and 2.25 fibers per square millimeter and the plurality of optical fibers is between 30 and 80 optical fibers.

6. The fiber optic distribution cable of claim 1, wherein the fiber density is between 1.45 and 1.95 fibers per square millimeter and the plurality of optical fibers is between 30 and 50 optical fibers.

7. The fiber optic distribution cable of claim 1, wherein the outer jacket has a maximum outer diameter of less than or equal to 5.8 millimeters and the fiber density is between 1.45 and 1.95 fibers per square millimeter.

8. The fiber optic distribution cable of claim 1, wherein the outer jacket has a maximum outer diameter of less than or equal to 6.5 millimeters and the fiber density is between 2.1 and 2.25 fibers per square millimeter.

9. The fiber optic distribution cable of claim 1, wherein the plurality of optical fibers have nominal outer diameters of 250 microns.

10. The fiber optic distribution cable of claim 1, wherein the inner jacket has a wall thickness of between 0.35 and 1.1 millimeters.

11. The fiber optic distribution cable of claim 10, wherein the outer jacket has a wall thickness of between 0.5 and 1.4 millimeters.

12. The fiber optic distribution cable of claim 1, wherein the inner jacket and the outer jacket are one of riser-rated or plenum-rated.

13. The fiber optic distribution cable of claim 1, wherein the cable has a tensile strength of greater than or equal to 150 pounds.

14. A fiber optic distribution cable comprising:
a central inner jacket;
a plurality of optical fibers disposed within the inner jacket, wherein the plurality of optical fibers are intermittently bonded into one or more ribbons;
a plurality of first strength members disposed within the inner jacket;
an outer jacket surrounding the central inner jacket; and
a plurality of second strength members disposed between the outer jacket and the central inner jacket,
wherein optical fibers of each of the one or more ribbons are intermittently bonded together by bonded portions,
wherein the bonded portions are spaced apart from one another along the lengths of the optical fibers, and
wherein the inner jacket and the outer jacket are formed from a polyolefin.

15. The fiber optic distribution cable of claim 14, wherein the bonded portions of neighboring optical fibers are staggered along the lengths of the optical fibers.

16. The fiber optic distribution cable of claim 14, wherein the inner jacket and the outer jacket are one of riser-rated or plenum-rated.

17. The fiber optic distribution cable of claim 14, wherein the cable has a tensile strength of greater than or equal to 150 pounds.

* * * * *